US012134439B2

(12) United States Patent
Barenbrug et al.

(10) Patent No.: US 12,134,439 B2
(45) Date of Patent: Nov. 5, 2024

(54) TILTING SUSPENSION FOR A VEHICLE

(71) Applicant: YOUSEE B.V., Amsterdam (NL)

(72) Inventors: Machiel Gerardus Theodorus Marie Barenbrug, Amsterdam (NL); Alexander Plul Johannus De Visser, Amsterdam (NL); Pel Ariesen, Amsterdam (NL)

(73) Assignee: YOUSEE B.V., Amsterdam (NL)

(*) Notice: Subject to any disclaimer, the term of this patent is extended or adjusted under 35 U.S.C. 154(b) by 808 days.

(21) Appl. No.: 17/053,838

(22) PCT Filed: May 7, 2019

(86) PCT No.: PCT/EP2019/061674
§ 371 (c)(1),
(2) Date: Nov. 9, 2020

(87) PCT Pub. No.: WO2019/215144
PCT Pub. Date: Nov. 14, 2019

(65) Prior Publication Data
US 2021/0229774 A1 Jul. 29, 2021

(30) Foreign Application Priority Data
May 8, 2018 (NL) .................................... 2020889

(51) Int. Cl.
*B62K 25/26* (2006.01)
*B62J 43/13* (2020.01)
(Continued)

(52) U.S. Cl.
CPC ............... *B62K 25/26* (2013.01); *B62J 43/13* (2020.02); *B62K 5/027* (2013.01); *B62K 5/06* (2013.01);
(Continued)

(58) Field of Classification Search
CPC .. B62K 25/26; B62K 5/027; B62K 2005/001; B62K 5/10; B62K 5/06; B62K 2201/00;
(Continued)

(56) References Cited

U.S. PATENT DOCUMENTS 2,863,672 A * 12/1958 Murata ................. B62K 25/26
280/283
3,309,097 A * 3/1967 Seeber ................... B62D 49/08
180/41

(Continued)

FOREIGN PATENT DOCUMENTS

| CH | 705136 A1 | 12/2012 |
|---|---|---|
| CN | 2367530 Y | 3/2000 |

(Continued)

OTHER PUBLICATIONS

International Preliminary Report on Patentability from corresponding PCT Application No. PCT/EP2019/061674, dated Nov. 10, 2020.

(Continued)

*Primary Examiner* — Timothy Wilhelm
(74) *Attorney, Agent, or Firm* — Harness, Dickey & Pierce, P.L.C.

(57) ABSTRACT

A tiltable vehicle (100) is described comprising a vehicle frame (102, 108), one front wheel (124), two rear wheels (112A, 112B) and two swing arms. The swing arms are pivotably coupled to a pivot point (121) on the vehicle frame at a first end, and to one of the rear wheels at an opposing end. A swing arm (41) is rotatable around a rotational axis (42) lying in a plane of symmetry of the vehicle frame (102, 108). Each of two linkages (63, 64) is coupled at a first end to one of the swing arms at the pivot point. The vehicle comprises two connection arms (53, 56) arranged between the linkages (63, 64) and one outer end of the rocker arm (40). The connection arms comprise resilient members (61,
(Continued)

62) comprising a number of Belleville springs arranged in at least two groups of rings so as to create a non-linear spring characteristic.

8 Claims, 6 Drawing Sheets

(51) Int. Cl.
| | |
|---|---|
| *B62K 5/00* | (2013.01) |
| *B62K 5/027* | (2013.01) |
| *B62K 5/06* | (2006.01) |
| *B62M 6/40* | (2010.01) |
| *B62M 6/90* | (2010.01) |

(52) U.S. Cl.
CPC .............. *B62M 6/40* (2013.01); *B62M 6/90* (2013.01); *B62K 2005/001* (2013.01); *B62K 2201/00* (2013.01); *B62K 2202/00* (2013.01)

(58) Field of Classification Search
CPC ....... B62K 2202/00; B62J 43/13; B62M 6/90; B62M 6/40; B62M 6/65
See application file for complete search history.

(56) References Cited

U.S. PATENT DOCUMENTS

| | | | | |
|---|---|---|---|---|
| 3,792,748 | A | | 2/1974 | Regier |
| 3,858,665 | A | * | 1/1975 | Winker .................. C09K 8/60 172/816 |
| 3,873,079 | A | * | 3/1975 | Kuus ........................ F16F 1/32 267/162 |
| 4,003,443 | A | * | 1/1977 | Boughers ................ B62K 5/10 180/361 |
| 4,375,293 | A | | 3/1983 | Solbes |
| 4,484,648 | A | * | 11/1984 | Jephcott .............. B60G 21/007 280/6.15 |
| 4,666,018 | A | * | 5/1987 | Shibuya .............. B60G 11/225 180/213 |
| 4,671,525 | A | * | 6/1987 | Ribi ........................ B62M 9/00 180/227 |
| 4,887,829 | A | * | 12/1989 | Prince .................... B60G 21/05 280/282 |
| 5,390,903 | A | * | 2/1995 | Fidziukiewicz ........ F16F 15/06 267/28 |
| 5,611,555 | A | * | 3/1997 | Vidal ...................... B62D 9/02 280/282 |
| 7,204,333 | B2 | * | 4/2007 | Kuroki .................. B62K 5/027 180/375 |
| 8,376,372 | B2 | * | 2/2013 | Kanou .................... B62K 5/05 280/5.509 |
| 8,500,108 | B2 | * | 8/2013 | Rode ........................ F16F 1/32 267/260 |
| 8,915,323 | B2 | * | 12/2014 | Tsujii ...................... B62K 5/06 180/312 |
| 8,919,751 | B2 | * | 12/2014 | Kneidel ................... F16F 3/02 192/214.1 |
| 9,248,857 | B2 | * | 2/2016 | Spahl ...................... B62D 9/02 |
| 9,381,785 | B2 | * | 7/2016 | Gale ........................ B62D 9/02 |
| 9,708,005 | B2 | * | 7/2017 | Reusser ............... B60G 21/007 |
| 10,023,019 | B2 | * | 7/2018 | Spahl ..................... B60G 17/00 |
| 10,843,759 | B2 | * | 11/2020 | Hirakawa ............. B62K 5/027 |
| 11,137,045 | B2 | * | 10/2021 | Gandhi .................... F16F 1/32 |
| 11,565,763 | B1 | * | 1/2023 | Gilmore .................. B62J 1/065 |
| 2006/0060400 | A1 | * | 3/2006 | Iwashita ................ B62K 25/20 180/220 |
| 2011/0254238 | A1 | * | 10/2011 | Kanou .................... B62K 5/027 280/5.509 |
| 2013/0068550 | A1 | * | 3/2013 | Gale ........................ B62D 9/02 280/5.509 |
| 2014/0238764 | A1 | | 8/2014 | Tsujii et al. |
| 2016/0059923 | A1 | | 3/2016 | Simon et al. |
| 2022/0017121 | A1 | * | 1/2022 | McLean ............... G06V 20/593 |

FOREIGN PATENT DOCUMENTS

| | | |
|---|---|---|
| CN | 102602493 A | 7/2012 |
| CN | 203372344 U | 1/2014 |
| CN | 103842242 A | 6/2014 |
| CN | 105992727 A | 10/2016 |
| CN | 107176254 A | 9/2017 |
| CN | 107709056 A | 2/2018 |
| EP | 1346907 A2 | 9/2003 |
| EP | 1366934 A1 | 12/2003 |
| JP | 2002128419 A | 5/2002 |
| JP | 2013112297 A | 6/2013 |
| JP | 2014058790 A | 4/2014 |
| TW | M489099 U | 11/2014 |
| WO | WO-0244008 A2 | 6/2002 |

OTHER PUBLICATIONS

International Search Report and Written Opinion of the International Searching Authority from corresponding PCT Application No. PCT/EP2019/061674, dated Aug. 5, 2019.

* cited by examiner

TILTING SUSPENSION FOR A VEHICLE

CROSS-REFERENCE TO RELATED APPLICATIONS

This application is a national phase application of PCT Application No. PCT/EP2019/061674, filed on 7 May 2019, which claims benefit of Netherland Patent Application No. 2020889, filed on 8 May 2018. The entire disclosure of the applications identified in this paragraph are incorporated herein by references.

FIELD OF THE INVENTION

The invention relates to a tiltable vehicle, such as a three wheeled electric scooter.

BACKGROUND ART

Patent application WO2015121289 (A1) describes a three-wheeled vehicle which is tiltable due to the presence of two swing arms which couple the rear wheels to the frame of the vehicle. The vehicle comprises a suspension to achieve some comfort for the driver. No specifics are mentioned relating to the suspension.

SUMMARY OF THE INVENTION

One of the objects of the invention is to provide a tiltable vehicle having an improved suspension.

The invention provides a tiltable vehicle, comprising a vehicle frame, one front wheel and two rear wheels. The vehicle also comprises two swing arms, each of the swing arms being pivotably coupled to a pivot point on the vehicle frame at a first end, and coupled to one of the rear wheels at an opposing end. A rocker arm is rotatably arranged around a rotational axis lying in a plane of symmetry of the vehicle frame. The vehicle further comprises two linkages, each of the linkages being coupled at a first end to one of the swing arms at the pivot point, and two connection arms, each being arranged between a second end of one of the linkages and one outer end of the rocker arm. Each of the connection arms comprises a resilient member, the resilient member comprising a number of Belleville springs arranged in at least two groups of rings so as to create a non-linear spring characteristic.

This arrangement allows a high ratio between non-tilting but suspension related travel and forces on the rear wheels and the travel of the linkages in a confined space while the weight of the resilient element can be minimal.

In is noted that since the suspension parts of the vehicle are arranged in a confined space, e.g. next to a battery pack of the vehicle, it is favorable to use suspension means that allow little deflection over which applied forces can be dissipated. This fact is best facilitated by the utilization of Belleville springs which are capable of absorbing large amount of force in short displacements.

Optionally, the resilient members are arranged so that when the resilient members are increased, the Belleville springs are compressed.

Optionally, each group of Belleville springs comprises at least one of the following configurations:
 two springs in series;
 two springs in series and one additional spring arranged in parallel at both sides of the two springs in series;
 two springs in series and two additional springs arranged in parallel at both sides of the two springs in series;
 two springs in series and three additional springs arranged in parallel at both sides of the two springs in series.

The non-linear spring characteristics provided by such variation in the Belleville springs orientation and stacking can be used to provide a comfortable suspension while the arrangement of the parallel springs with the highest amount providing the stiffest spring characteristics prevents damage to the complete suspension chain in case of excessive forces posed upon the rear wheels or swing arms.

The non-linear spring characteristic may be continuously increasing, at variable rate, with increasing spring stroke.

BRIEF DESCRIPTION OF THE DRAWINGS

These and other aspects of the invention are apparent from and will be elucidated with reference to the embodiments described hereinafter. In the drawings, FIG. 1 schematically shows a perspective view of a tiltable vehicle according to an embodiment.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
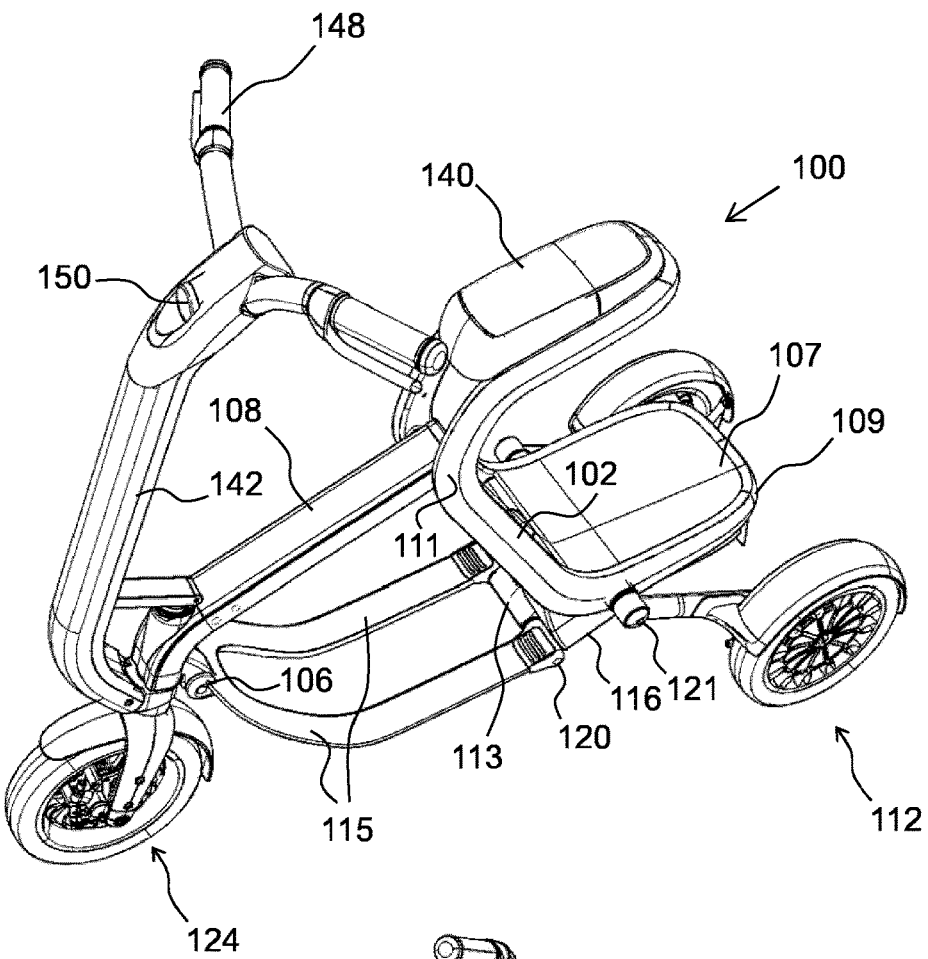

FIG. 1 schematically shows a perspective view of a tiltable vehicle 100 according to an embodiment. In this example, the vehicle 100 comprises a front wheel 124 and two rear wheels 112, only one of which is visible in FIG. 1. The vehicle 100 may be motor driven with an electric motor that may be arranged in a hub of the front wheel 124. The vehicle 100 further comprises a seat 140, a handle bar frame 142 and handle bars 148. A light module 150 is arranged onto the handle bar frame 142. The vehicle 100 also comprises a front frame element 108 arranged between the seat 140 and the handle bar frame. Below the seat 140 is a main back frame rod 102, a bow 109 and a battery 107. The lighting module 150 and the motor may be powered by the battery.

Figure 2:
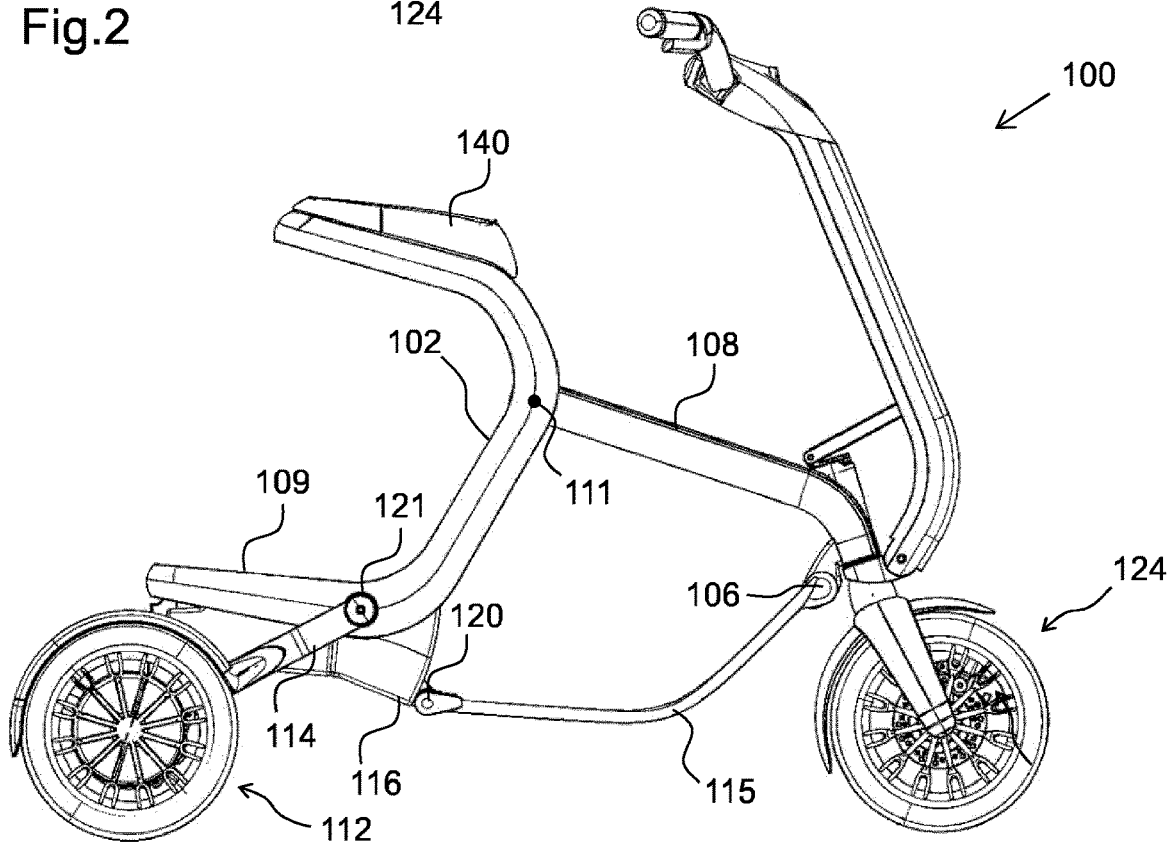
FIG. 2 schematically shows a side view of the vehicle of FIG. 1.

The vehicle 100 comprises a coupling frame which is formed by two rods 116, two curved slats 115 and a bridge 113 arranged at a hinge joint 120, see also FIG. 2 which shows a side view of the vehicle 100. The curved slats 115 are rotatably arranged onto the front frame element 108 at a hinge connection 106. The back wheels 112 are attached to the back frame via support rods 114, and are rotatably connected to the back frame at a rotation point 121. The support rods 114 also referred to as swing arms 114. In this way, each of the back wheels 112 is able to translate relative to the back frame (i.e. the main back frame rod 102). It is noted that the bridge 113 at the hinge joint 120 is optional and could be left out, however the bridge 113 improves the strength of the coupling frame.

As can be seen from FIG. 2, part of the rods 116 are enclosed by the bow 109 if the vehicle is in the unfolded state. Due to the presences of the hinges 111, 110, 120 and 106, the two hinges 110 and 106 will be forced further apart once a user is sitting on the seat 140. This means that the coupling frame is stretched out and that the hinge joint 120 is forced upwards. It is noted that the slats can be made out of a flexible material, but alternatively the slats may be stiff. They may be made out wood, plastic or metal, or any other suitable material.

Figure 3:
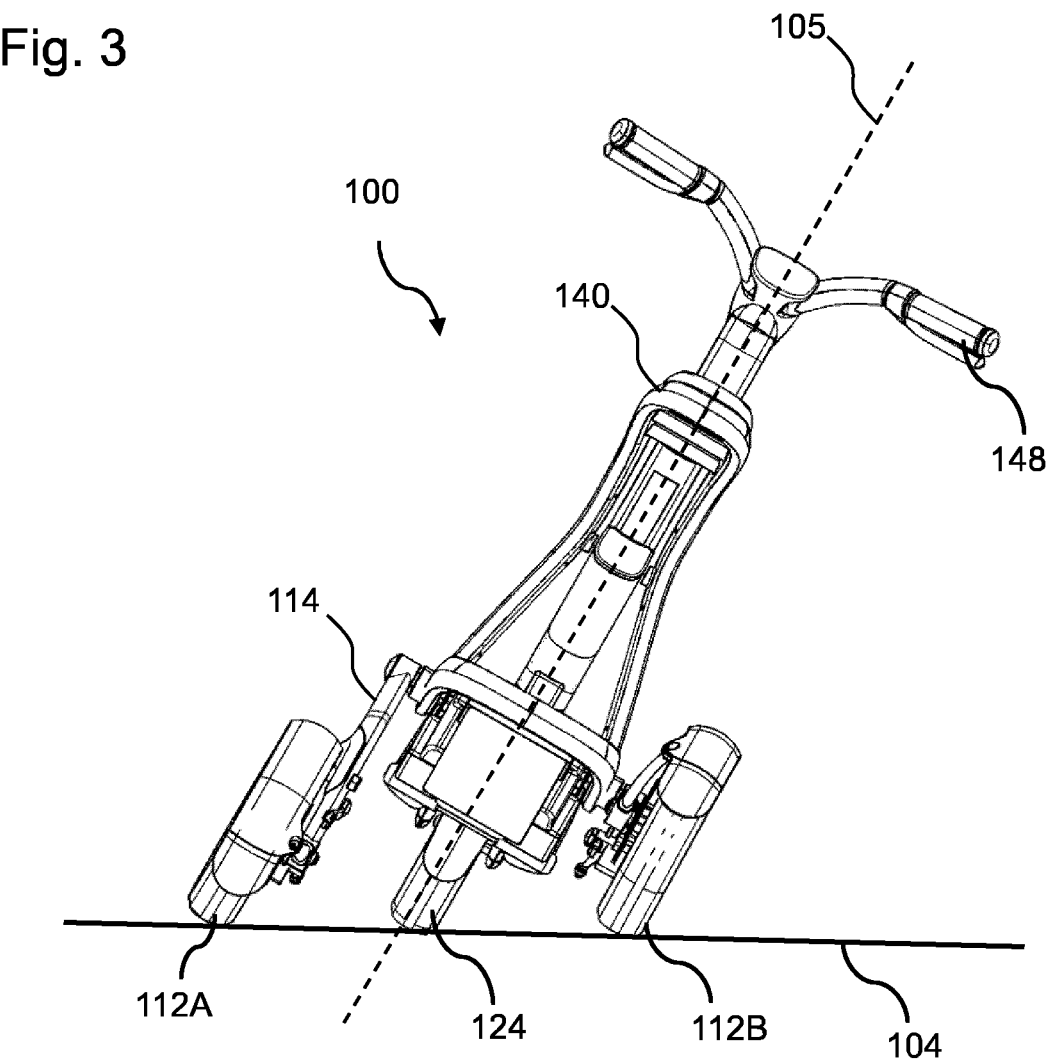
FIG. 3 schematically shows a back view of the vehicle in a tilted position.

FIG. 3 schematically shows a back view of the vehicle 100 in a tilted position. The dashed line 105 indicates a plane of symmetry of the frame of the vehicle 100. This plane of symmetry 105 (also referred to as main plane) makes an angle with the ground 104 when the vehicle 100 is tilted. The tilting of the vehicle 100 may be a result of a user (not shown) leaning to the right when turning right, see the example of FIG. 3. Due to the rotation of the swing arms 114, and a specific coupling mechanism between the swing arms 114, both rear wheels 112 wheel keep contact with the ground.

Figure 4:
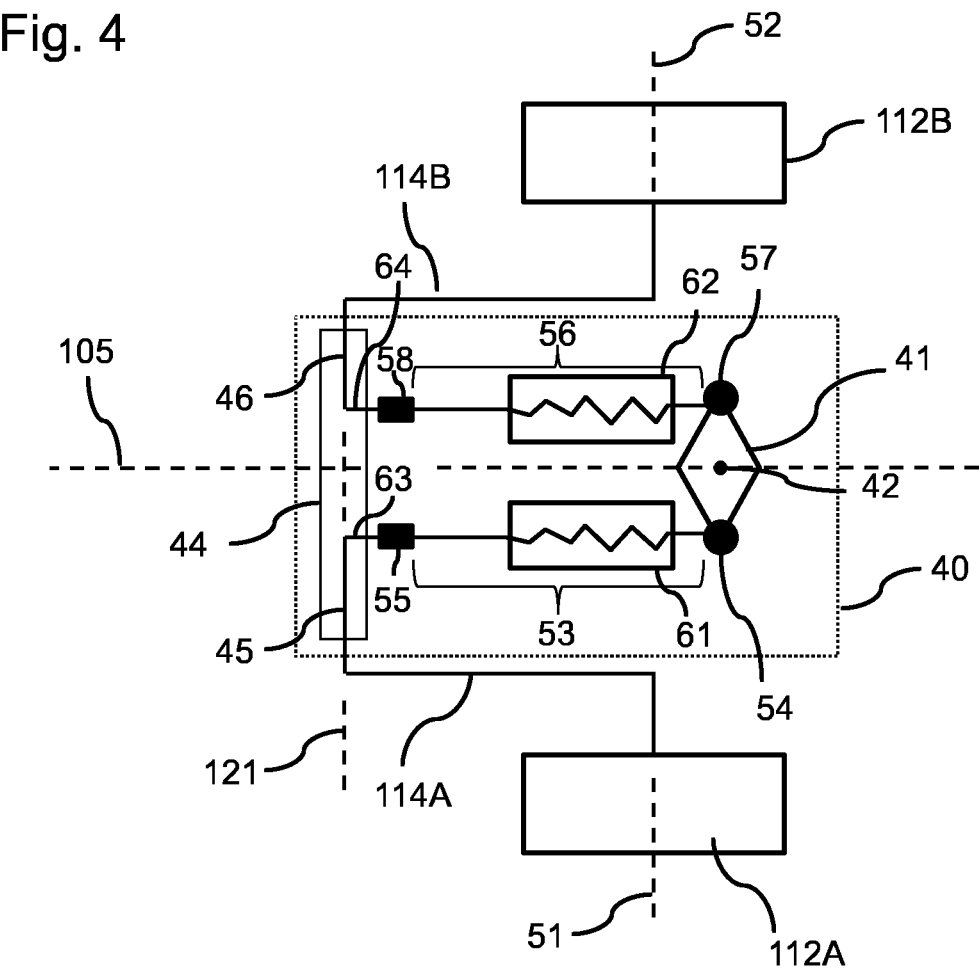
FIG. 4 schematically shows a bottom view of part of the vehicle of FIG. 1.

FIG. 4 schematically shows a bottom view of part of the vehicle. FIG. 4 shows a sub frame 40 which is fixed to the frame (not shown) of the vehicle. A rocker arm 41 is rotatably coupled to the sub frame 40 and is rotatable around a rotation axis 42. The rotation axis 42 lies in the plane of symmetry 105. A virtual tube 44 is fixed to the sub frame 40 and extends in a direction perpendicular to the plane of symmetry 105 of the vehicle frame. Within the virtual tube 44, two axles 45, 46 are rotatably arranged around a rotation axis 121. Each of these axles 45, 46 is fixed to one of the swing arms 114A, 114B respectively. The swing arms 114A, 114B are connected to the wheels 112A, 112B. The first rear wheel 112A is rotatably arranged around a rotation axis 51, and the second rear wheel 112B is rotatably arranged around a rotation axis 52. It is noted that in the fully upright position of the vehicle 100, the rotation axes 51 and 52 are aligned.

FIG. 4 further shows that a first connection arm 53 is arranged between a pivot point 54 on the rocker arm 41 and a pivot point 55. Similarly, a second connection arm 56 is arranged between a pivot point 57 on the rocker arm 41 and a pivot point 58. In between the pivot point 55 and the axle 45, a first linkage 63 is arranged. Similarly, in between the pivot point 58 and the axle 46, a second linkage 64 is arranged. Each of the linkages 63, 64 is coupled at a first end to one of the swing arms at the pivot point 121. A second end of the linkages 63, 64 is coupled to one outer end of the rocker arm 41.

To provide for some comfort for the driver during driving, the rear wheels 112 are suspended. Suspension is realized by resilient member 61, 62 comprised in each of the connection arms 53, 56. By arranging a resilient member 61, 62 in the connection arms 53, 56, the length of the connection arms will change if a force is applied.

Figure 5A:
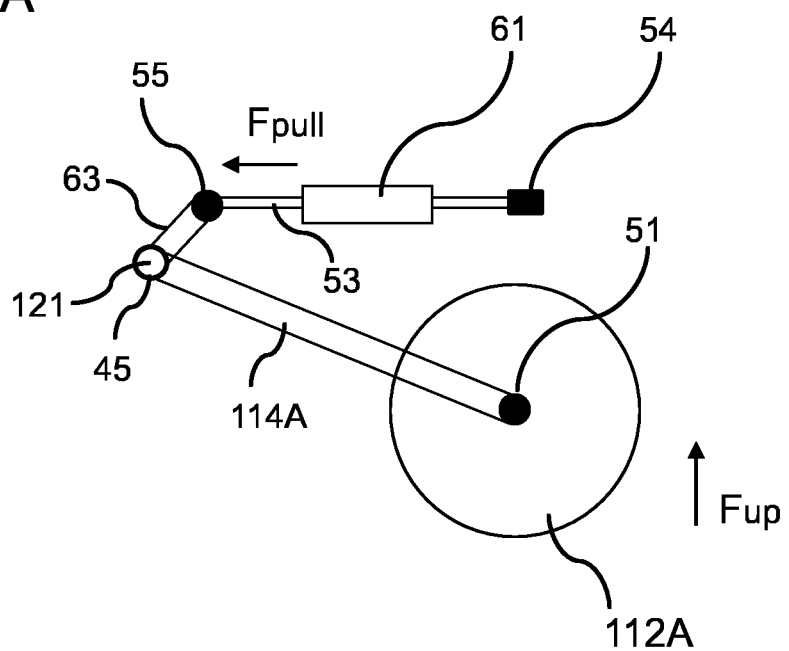
FIG. 5A schematically shows of one rear wheel with its suspension arrangement.

FIG. 5A shows a side view of one of the rear wheels 112A with its suspension arrangement. When during driving, the rear wheel 112A meets a bump on the road, the rear wheel is suddenly forced upwards, as indicated with an arrow $F_{up}$. Due to the fact that the sing arm 114A is coupled to the linkage 63, which both are rotatable around axis 121, the connection arm 53 is pulled at, indicated by an arrow $F_{pull}$ in FIG. 5A. It is noted that although the rocker arm 41 can rotate, it will not do so when a sudden force is applied on both wheels 112. The rocker arm 41 is only meant to rotate, if the tilting angle of the vehicle changes. This means that, without changing the tilting angle, the pivot point 54 at one of the outer ends of the rocker arm 41 should be regarded as a fixed point in FIG. 5A. So when the connection arm 53 is pulled at, the resilient member 61 will be extended. Once the force upwards $F_{up}$ has ended, the pulling force disappears, and the resilient member 61 will shorten and get back in its unloaded state.

It is noted that in this embodiment the swing arm 114A itself is not resilient. The suspension of the rear wheels described above is a result of the fact that the swing arm 114A is arranged to rotate around the rotational point 121 and that it is fixed to the connection arm 53 comprising the resilient member 61.

Figure 5B:
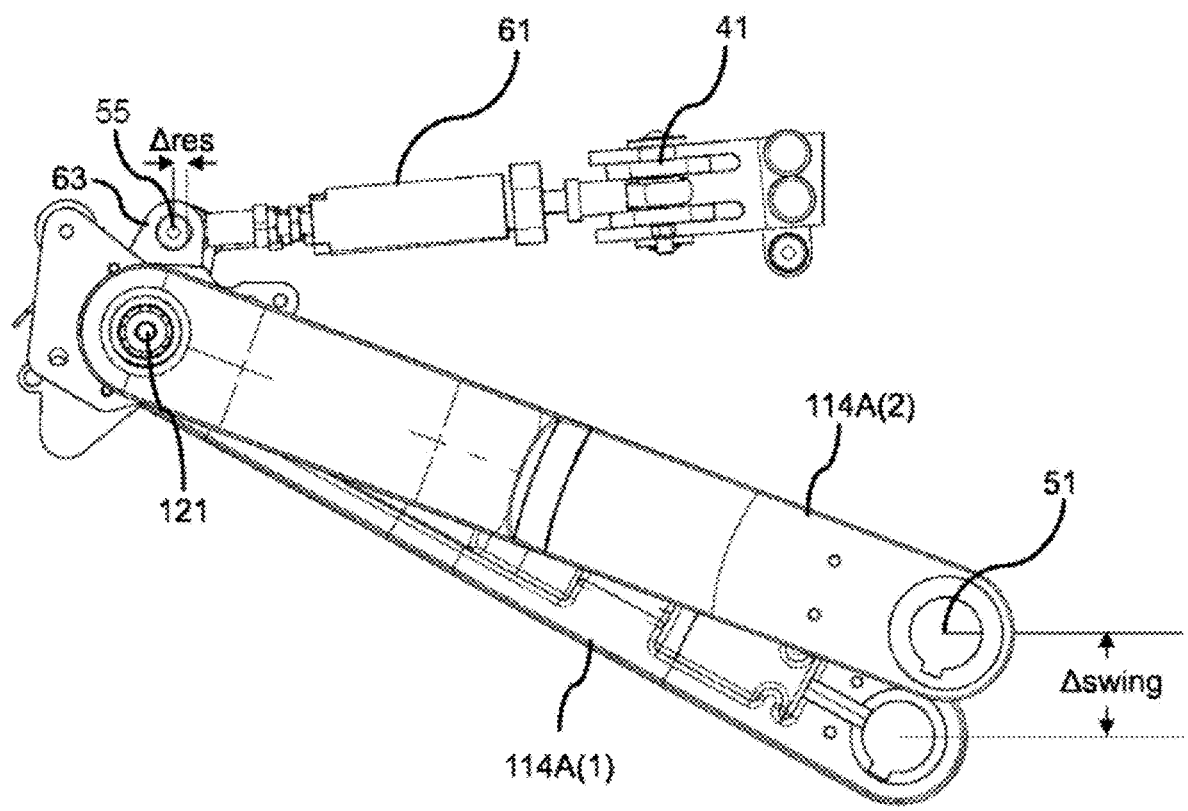
FIG. 5B shows a side view of part of the suspension arrangement in the non-tilting position according to an embodiment.

FIG. 5B shows a side view of part of the suspension mechanism in the non-tilting position according to an embodiment. The swing arm 114A is shown twice, i.e. once in an unloaded situation, see 114A(1), and once in a loaded situation, see 114A(2). The vertical displacement of the rotation axis 51 due to the load is referred to as $\Delta_{swing}$, while the displacement of the pivot point 55 along the extension direction of the resilient member 61, due to the load is referred to as Ares. The value of Ares directly relates to the extension of the resilient member 61. In a specific embodiment, the length of the swing arm 114A (defined as the distance between pivot point 121 and rotation axis 51) is 330 mm, and the length of the linkage 63 (defined as the distance between the pivot point 55 and the pivot point 121) is 40 mm. In that case the suspension ratio, defined as Δswing/Δres is equal to 330/40=8,25. In a preferred embodiment, this suspension ratio lies in a range between 8 and 14.

Table 1 below shows an example of the pivot angle of the swing arm 114A (Sw.A.Rot) and the so-called rod extension (Rod_EXT), which is equal to the compression of the resilient member 61, for different loads. The values for the length of the rod (L_rod) and rod extension in table 1 are shown in mm.

TABLE 1

| Load (Kg) | Def. (mm) | Sw.A.Rot (Deg) | Torque Nm | L_Rod | Rod_EXT |
|---|---|---|---|---|---|
| 60 | 6 | 1 | 67 | 189.4581 | 0.658074 |
| 70 | 12 | 2 | 78 | 190.1204 | 1.320357 |
| 80 | 18 | 3 | 89 | 190.7866 | 1.986605 |
| 90 | 24 | 4 | 101 | 191.4566 | 2.656574 |
| 100 | 30 | 5 | 112 | 192.13 | 3.330024 |
| 110 | 36 | 6 | 123 | 192.8067 | 4.006713 |
| 120 | 42 | 7 | 134 | 193.4864 | 4.686402 |

Each of the resilient members 61, 62 comprises a number of rings, so-called coned-disc springs better known as Belleville washers or Belleville springs. The springs are arranged in at least two groups with different stacking and/or orientation configurations so as to create a non-linear spring characteristic.

Figure 6:
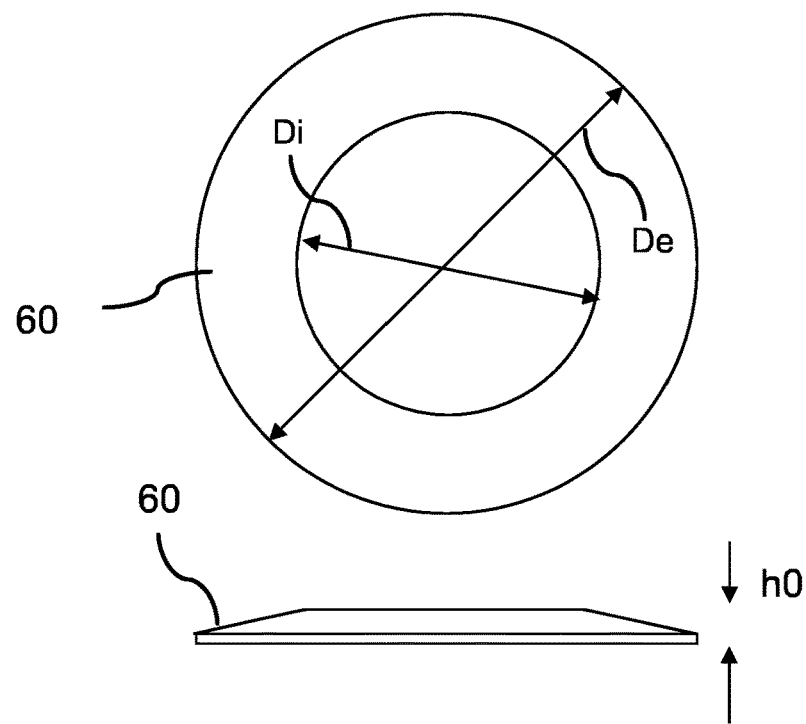
FIG. 6 schematically shows a top view and a side view of one Belleville spring according to an embodiment.

FIG. 6 schematically shows a top view and a side view of one Belleville spring according to an embodiment. The spring 60 has an inner diameter Di and an outer diameter De. As can be seen from the lower part of FIG. 6, the suspension ring 60 is not completely flat; the inner circumference lies in a plane parallel to, but not in, the plane of the outer circumference of the ring. When a sufficient force is applied on the suspension ring 60, it is pressed in and the ring will be flattened completely or to some extent, depending on the force applied and the strength of the suspension ring 60.

Figure 7:
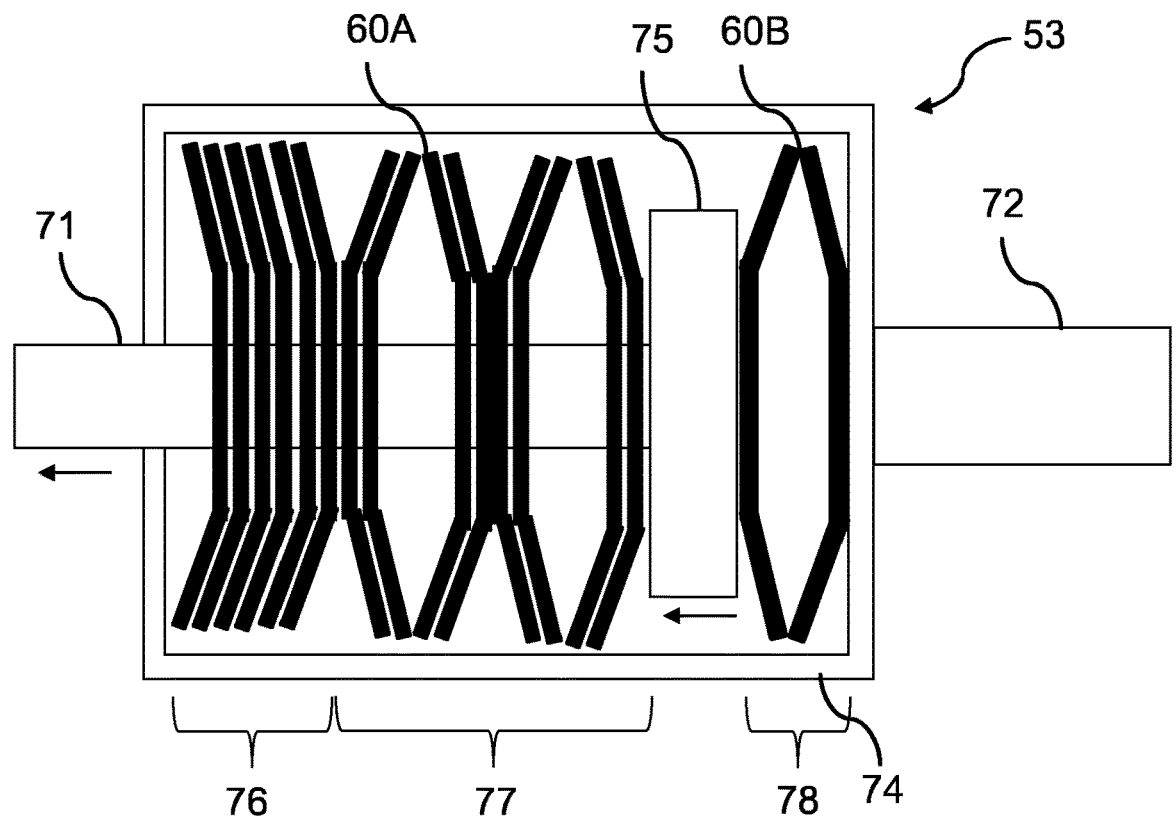
FIG. 7 schematically shows a cross section of the connection arm of FIG. 5A according to an embodiment.

FIG. 7 schematically shows a cross section of the connection arm 53 of FIG. 5A according to an embodiment. The connection arm 53 comprises a first linkage 71 and a second linkage 72. The first linkage 71 is resiliently coupled to the second linkage 72 via a shock absorber, which embodies the resilient member 61 shown in FIG. 4. The shock absorber comprises an outer housing 74, which may be, but is not restricted to, a cylindrical housing. The outer housing 74 is fixed at one side to the linkage 72. At an opposing side, the outer housing 74 comprises an opening for the other linkage, it is linkage 71, to move in and out. In the outer housing 74 an end stop 75 is arranged which is fixed at an outer end of the linkage 71. In this particular example, ten Belleville springs 60A are arranged within the outer housing 74. The springs 60A are arranged around the linkage 71. The cross section of the linkage 71 is smaller than the inner diameter Di of the springs 60A. The linkage 71 preferably has a circular cross section, so that the springs 60A can conveniently be arranged around the linkage 71. It is however noted that the cross section of the linkage can have different forms, such as rectangular or triangular, or star-shaped, etcetera.

The springs 60 are arranged in a specific arrangement. In this example, six sings are arranged in parallel, see group 76, and another four springs are arranged in series-parallel, see group 77. Each of the groups 76 and 77 will have a linear spring rate characteristic, but when combined, the total spring characteristic will contain two slopes having different gradient, resulting in a non-linear spring rate characteristic.

Starting from a zero force, the spring characteristic will be determined by the weakest group, i.e. group 77. Once the force is reaching a certain value, the spring characteristic is determined by the stiffer group, being group 76. A further group 78 comprises two Belleville springs 60B in this example which are not arranged around linkage 71 and do not add to the total spring characteristic. The function of the group 78 is to dampen the movement of end stop 75, linkage 71 and surrounding components during the returning or downwards stroke of the rear wheels 112. It is noted that since springs 60B are not arranged around linkage 71 the outwards stroke of linkage 71 and end stop 75 are preferably less than 35% of the diameter of the springs 60B, to prevent them from rotating to a degree where they can't return to their original position during the returning stroke. Group 78 can comprise but is not restricted to Belleville springs. Other types of resilient elements can be used to fulfill the same function as provided by springs 60B in this example.

Figure 8:
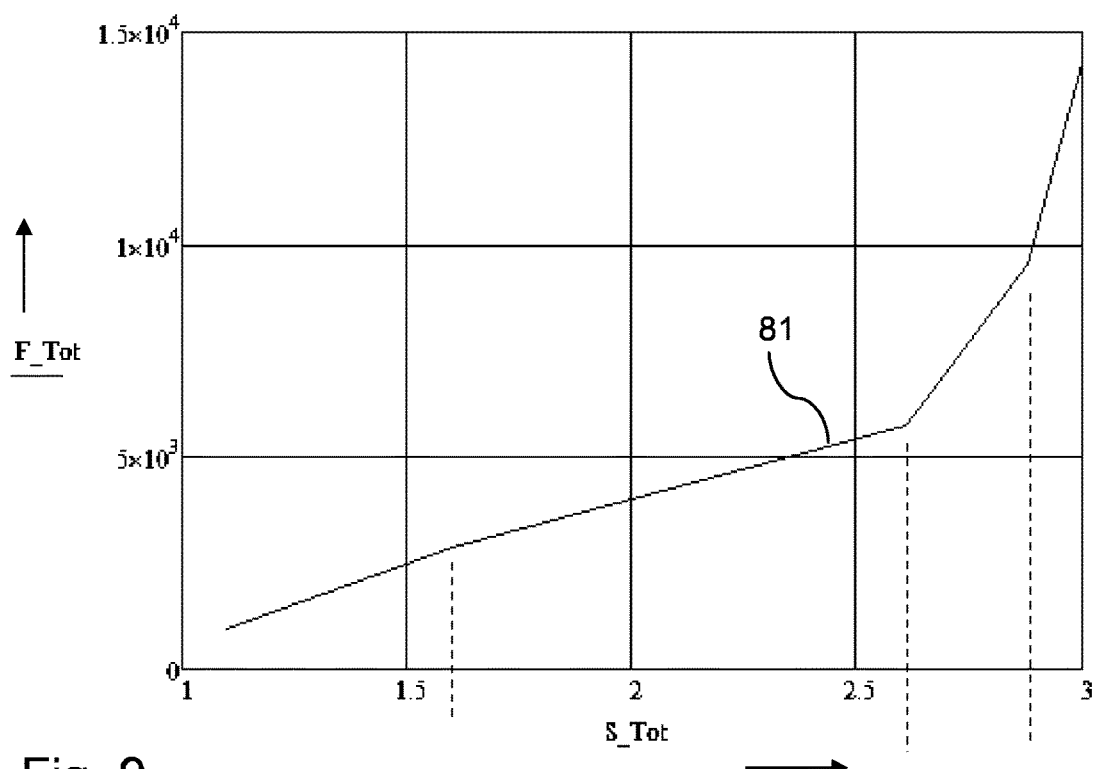
FIG. 8 shows a graph of the spring force versus the spring stroke according to an embodiment.

FIG. 8 shows a graph of the spring force versus the spring stroke according to an embodiment. In this embodiment, the resilient member 61 comprises four groups of Belleville springs. In the graph of FIG. 8 the value F_tot represents the total force on the resilient member, while S_tot represents the total spring stroke of the resilient member 61. As can be seen from FIG. 8, the line 81 shows three transitions, where the gradient of the graph suddenly changes. These changes can best be represented by showing a graph of the value d(F_tot)/dS as a function of S_tot, see also FIG. 9. In this specific example the value of d(F_tot)/dS shows four steps. The second step is lower than the first step. After the second step, the function shows two more steps, each of which is higher than a previous one.

Figure 9:
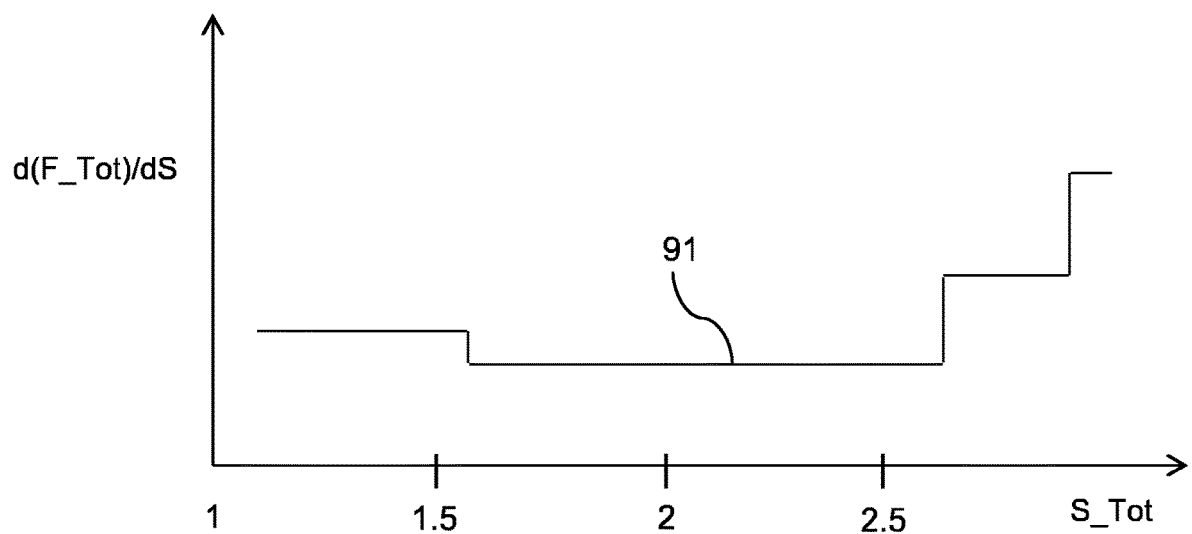
FIG. 9 shows a graph of the value $d(F\_tot)/dS$ as a function of $S\_tot$.

The highest step in FIG. 9 can be realized by arranging a number of Belleville springs in parallel, as was shown in FIG. 7, see the group 76. Such an arrangement of parallel springs will result in a very stiff suspension at the end of the characteristic. This last very steep part of FIG. 8 will avoid damage to the surrounding components in case of excessive forces. To still provide for sufficient comfort for the driver, the resilient member 61 at least also comprises a further group of rings, see group 77 in FIG. 7. Due to this group, the spring rate characteristic will have a less steep part as well.

It is noted that in the above, both the term "bars" and "tubes" are used. It is noted that a "tube" is regarded as a hollow bar, but that a "bar" as mentioned above does not necessarily need to be hollow. In some embodiments, the bars mentioned above could be homogenous (not hollow) or at least partly homogenous.

It should be noted that the above-mentioned embodiments illustrate rather than limit the invention, and that those skilled in the art will be able to design many alternative embodiments. The tiltable vehicle may for example comprise two front wheels instead of only one.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A tiltable vehicle, comprising:
    a vehicle frame;
    one front wheel;
    two rear wheels;
    two swing arms, each of the swing arms being pivotably coupled to a pivot point on the vehicle frame at a first end, and coupled to one of the rear wheels at an opposing end;
    a rocker arm rotatably arranged around a rotational axis lying in a plane of symmetry of the vehicle frame;
    two linkages, each of the linkages being coupled at a first end to one of the swing arms at the pivot point, wherein the linkages are coupled at an angle to the swing arms;
    two connection arms, each being arranged between a second end of one of the linkages and one outer end of the rocker arm;
    wherein each of the connection arms comprises a resilient member, the resilient member comprising a number of Belleville springs arranged in at least two groups of rings so as to create a non-linear spring characteristic, wherein the non-linear spring characteristic is continuously increasing with increasing spring stroke, and wherein a derivative of the non-linear spring characteristic comprises an increasing stair case function.

2. The vehicle according to claim 1, wherein the resilient members are arranged so that when the resilient members are increased, the Belleville springs are compressed.

3. The vehicle according claim 1, wherein each group of Belleville springs comprises at least one of the following configurations:
    two springs in series;
    two springs in series and one additional spring arranged in parallel at both sides of the two springs in series;
    two springs in series and two additional springs arranged in parallel at both sides of the two springs in series; and
    two springs in series and three additional springs arranged in parallel at both sides of the two springs in series.

4. The vehicle according to claim 1, wherein a derivative of the non-linear spring characteristic is an increasing stair case function except for a transition between a first step a second step.

5. The vehicle according to claim 4, wherein the stair case function has four steps.

6. The vehicle according to claim 5, wherein the vehicle comprises an electric motor and a battery for powering the motor.

7. The vehicle according to claim 1, wherein the stair case function has four steps.

8. The vehicle according to claim 7, wherein the vehicle comprises an electric motor and a battery for powering the motor.

* * * * *